US012780196B2

(12) United States Patent
Dawson et al.

(10) Patent No.: US 12,780,196 B2
(45) Date of Patent: Nov. 3, 2026

(54) VEHICLE OPERATION AROUND OTHER VEHICLES

(71) Applicant: Ford Global Technologies, LLC, Dearborn, MI (US)

(72) Inventors: Brandon M. Dawson, Bloomfield Hills, MI (US); Ozgenur Kavas Torris, Dearborn, MI (US); Imad Makki, Dearborn Heights, MI (US); Michael Hafner, San Carlos, CA (US); Abhishek Sharma, Lasalle/Ontario (CA); Yousaf Rahman, Ypsilanti, MI (US); Erol Dogan Sumer, Ann Arbor, MI (US); Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 18/760,427

(22) Filed: Jul. 1, 2024

(65) Prior Publication Data

US 2026/0001542 A1 Jan. 1, 2026

(51) Int. Cl.
*B60W 30/16* (2020.01)

(52) U.S. Cl.
CPC ....... *B60W 30/16* (2013.01); *B60W 2554/404* (2020.02); *B60W 2720/106* (2013.01)

(58) Field of Classification Search
CPC ......... B60W 60/0015; B60W 2520/10; B60W 2520/105; B60W 2554/404;
(Continued)

(56) References Cited

U.S. PATENT DOCUMENTS

| | | | | |
|---|---|---|---|---|
| 11,304,036 | B2 | 4/2022 | Yang et al. | |
| 11,919,514 | B1 * | 3/2024 | Ravella | B60W 60/001 |

(Continued)

FOREIGN PATENT DOCUMENTS

| | | | |
|---|---|---|---|
| CN | 111897213 | A | 6/2020 |
| CN | 115743116 | A | 3/2023 |

(Continued)

OTHER PUBLICATIONS

Bohara et al., "Adaptive Estimation-Based Safety-Critical Cruise Control of Vehicular Platoons", arXiv:2305.00952v2 [eess.SY] Aug. 1, 2023.

(Continued)

*Primary Examiner* — Peter D Nolan
*Assistant Examiner* — Ce Li Li
(74) *Attorney, Agent, or Firm* — Frank A. MacKenzie; Brooks Kushman P.C.

(57) ABSTRACT

A computer includes a processor and a memory, and the memory stores instructions executable by the processor to formulate a plurality of control barrier functions for a host vehicle, each control barrier function based on a respective kinematic state of a respective target vehicle; determine respective CBF input accelerations based on the respective control barrier functions; formulate a control-Lyapunov function for the host vehicle based on a target speed for the host vehicle; determine a Lyapunov input acceleration based on the control-Lyapunov function; select an input acceleration from an acceleration set including the CBF input accelerations and the Lyapunov input acceleration; and actuate a component of the host vehicle according to the selected input acceleration.

20 Claims, 3 Drawing Sheets

(58) Field of Classification Search
CPC ..... B60W 2554/802; B60W 2554/804; B60W 2720/10; B60W 2720/103; B60W 2720/106; B60W 2754/30; B60W 2754/50; G08G 5/80; B60K 31/0008
See application file for complete search history.

(56) References Cited

U.S. PATENT DOCUMENTS

| | | | | |
|---|---|---|---|---|
| 12,515,703 | B2 * | 1/2026 | Chen | B60W 30/02 |
| 2010/0198478 | A1 * | 8/2010 | Shin | B60W 30/16 701/96 |
| 2023/0020503 | A1 * | 1/2023 | Rahman | B60W 30/10 |
| 2024/0075955 | A1 * | 3/2024 | Chen | B60W 30/02 |
| 2024/0272636 | A1 * | 8/2024 | Black | B60W 60/0015 |
| 2025/0045637 | A1 * | 2/2025 | Singletary | B25J 9/1676 |

FOREIGN PATENT DOCUMENTS

| | | |
|---|---|---|
| GB | 2594762 | 11/2021 |
| KR | 102107726 B1 | 5/2020 |

OTHER PUBLICATIONS

Zhou et al., "Event-Triggered Multi-Lane Fusion Control for 2-D Vehicle Platoon Systems with Distance Constraints", November 2022IEEE Transactions on Intelligent Vehicles PP(99):1-14, DOI:10.1109/TIV.2022.3215133.

* cited by examiner

VEHICLE OPERATION AROUND OTHER VEHICLES

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
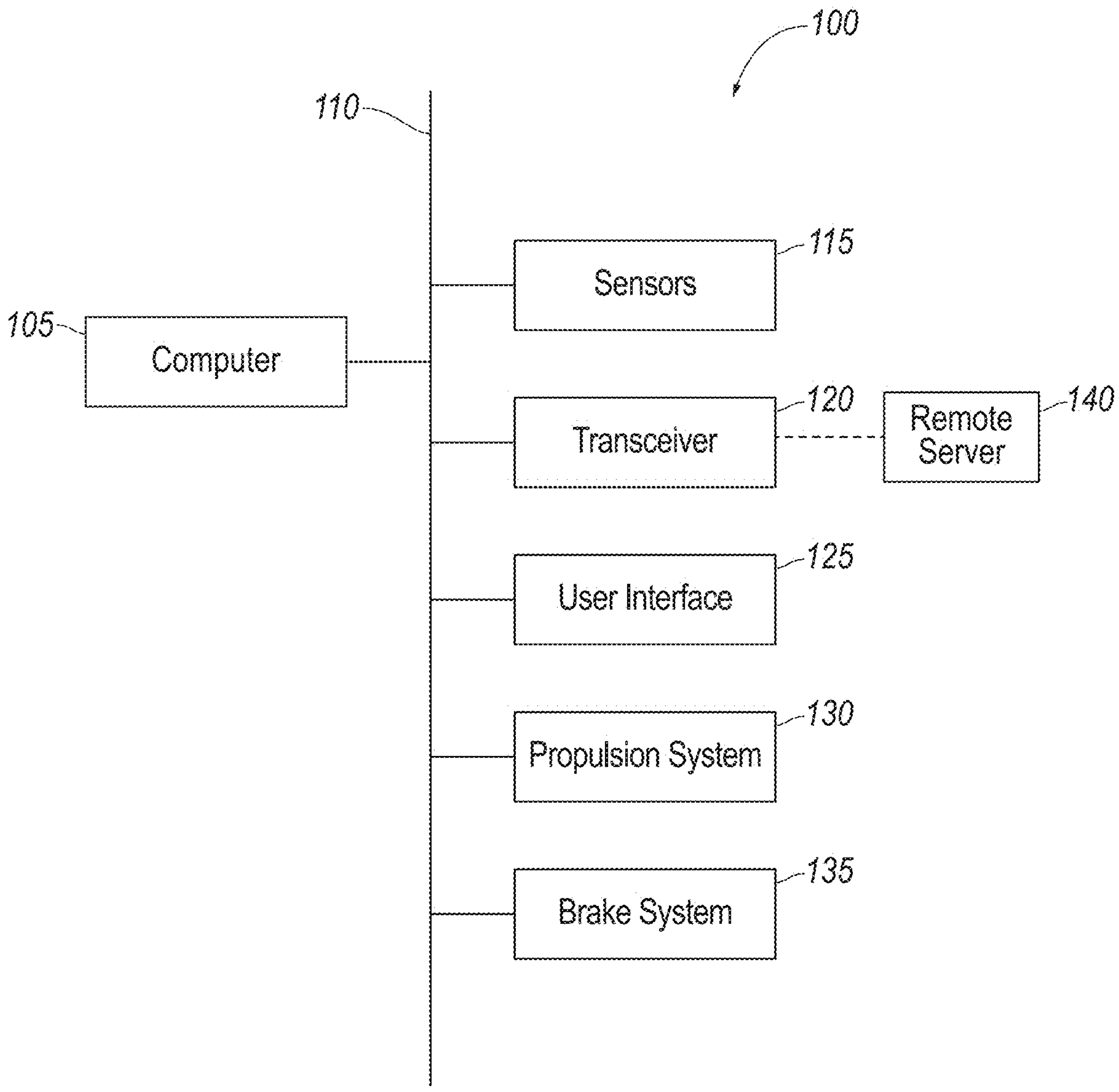
FIG. 1 is a block diagram of an example host vehicle.

The techniques described herein may decrease a likelihood of contact between a host vehicle and target vehicles by actuating a component of the host vehicle, e.g., braking or propulsion as part of an adaptive cruise control. In particular, the techniques can efficiently handle multiple target vehicles. A computer of the host vehicle is programmed to formulate a plurality of control barrier functions for a host vehicle, each control barrier function based on a respective kinematic state of a respective target vehicle; determine respective CBF input accelerations based on the respective control barrier functions; formulate a control-Lyapunov function for the host vehicle based on a target speed for the host vehicle; determine a Lyapunov input acceleration based on the control-Lyapunov function; select an input acceleration from an acceleration set including the CBF input accelerations and the Lyapunov input acceleration; and actuate a component of the host vehicle according to the selected input acceleration. The Lyapunov input acceleration is likely to set the acceleration when none of the CBF input accelerations indicate a lower acceleration. The multiple CBF input accelerations can account for multiple target vehicles. For example, one of the CBF input accelerations can be for a following target vehicle, rather than a leading target vehicle as is the case for conventional adaptive cruise control. For another example, one or more of the CBF input accelerations can be for target vehicles ahead of the leading target vehicle. The host vehicle may thus be able to decrease speed in anticipation of a slowdown of target vehicles ahead, even if the leading target vehicle has not yet slowed.

A computer includes a processor and a memory, and the memory stores instructions executable by the processor to formulate a plurality of control barrier functions for a host vehicle, each control barrier function based on a respective kinematic state of a respective target vehicle; determine respective CBF input accelerations based on the respective control barrier functions; formulate a control-Lyapunov function for the host vehicle based on a target speed for the host vehicle; determine a Lyapunov input acceleration based on the control-Lyapunov function; select an input acceleration from an acceleration set including the CBF input accelerations and the Lyapunov input acceleration; and actuate a component of the host vehicle according to the selected input acceleration.

In an example, at least one of the control barrier functions may be for a first target vehicle of the target vehicles, the first target vehicle being positioned behind the host vehicle. In a further example, at least one of the control barrier functions may be for a second target vehicle of the target vehicles, the second target vehicle being positioned forward of the host vehicle.

In an example, at least one of the control barrier functions may be for a first target vehicle of the target vehicles, the first target vehicle being positioned forward of the host vehicle; and at least one of the control barrier functions may be for a second target vehicle of the target vehicles, the second target vehicle being positioned forward of the first target vehicle.

In an example, the instructions may further include instructions to receive data indicating the kinematic states of the target vehicles from a server remote from the host vehicle.

In an example, the selected input acceleration may be a minimum of the CBF input accelerations and the Lyapunov input acceleration.

In an example, the acceleration set may include a preset maximum acceleration.

In an example, the acceleration set may include a sum of an actual acceleration of the host vehicle and a preset maximum change in acceleration.

In an example, the instructions may further include instructions to solve a plurality of analytic expressions for the respective CBF input accelerations, each analytic expression including the kinematic state of the respective target vehicle and a kinematic state of the host vehicle. In a further example, each analytic expression may include a difference between a gap between the host vehicle and the respective target vehicle and a target value for the gap.

In another further example, the target vehicles may include a first target vehicle positioned behind the host vehicle and a second target vehicle positioned forward of the host vehicle, and the analytic expressions for the first target vehicle and the second target vehicle may have a same formula.

In an example, the instructions may further include instructions to solve an analytic expression for the Lyapunov input acceleration, the analytic expression including the target speed of the host vehicle and a current speed of the host vehicle.

In an example, the component may include at least one of a propulsion system and a brake system.

In an example, the target vehicles may be in a lane of travel of the host vehicle.

A method includes formulating a plurality of control barrier functions for a host vehicle, each control barrier function based on a respective kinematic state of a respective target vehicle; determining respective CBF input accelerations based on the respective control barrier functions; formulating a control-Lyapunov function for the host vehicle based on a target speed for the host vehicle; determining a Lyapunov input acceleration based on the control-Lyapunov function; selecting an input acceleration from an acceleration set including the CBF input accelerations and the Lyapunov input acceleration; and actuating a component of the host vehicle according to the selected input acceleration.

In an example, at least one of the control barrier functions may be for a first target vehicle of the target vehicles, the first target vehicle being positioned behind the host vehicle.

In an example, the method may further include receiving data indicating the kinematic states of the target vehicles from a server remote from the host vehicle.

In an example, the selected input acceleration may be a minimum of the CBF input accelerations and the Lyapunov input acceleration.

In an example, the method may further include solving a plurality of analytic expressions for the respective CBF input accelerations, each analytic expression including the kinematic state of the respective target vehicle and a kinematic state of the host vehicle.

In an example, the component may include at least one of a propulsion system and a brake system.

With reference to the Figures, wherein like numerals indicate like parts throughout the several views, a computer 105 includes a processor and a memory, and the memory stores instructions executable by the processor to formulate a plurality of control barrier functions for a host vehicle 100, each control barrier function based on a respective kinematic state of a respective target vehicle 200; determine respective CBF input accelerations based on the respective control barrier functions; formulate a control-Lyapunov function for the host vehicle 100 based on a target speed for the host vehicle 100; determine a Lyapunov input acceleration based on the control-Lyapunov function; select an input acceleration from an acceleration set including the CBF input accelerations and the Lyapunov input acceleration; and actuate a component of the host vehicle 100 according to the selected input acceleration.

With reference to FIG. 1, the host vehicle 100 may be any passenger or commercial automobile such as a car, a truck, a sport utility vehicle, a crossover, a van, a minivan, a taxi, a bus, etc. The host vehicle 100 may include the computer 105, a communications network 110, sensors 115, a transceiver 120, a user interface 125, a propulsion system 130, and a brake system 135.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the transceiver 120, the user interface 125, the propulsion system 130, the brake system 135, and other components via the communications network 110.

The sensors 115 may provide data about operation of the host vehicle 100, for example, wheel speed, wheel orientation, and engine and transmission data (e.g., temperature, fuel consumption, etc.). The sensors 115 may detect the location and/or orientation of the host vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the host vehicle 100, such as the target vehicles 200, road lane markings, traffic lights and/or signs, road users, etc. For example, the sensors 115 may include radar sensors, ultrasonic sensors, scanning laser range finders, light detection and ranging (lidar) devices, and image processing sensors such as cameras.

The transceiver 120 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 120 may be adapted to communicate with a remote server 140, that is, a server distinct and spaced from the host vehicle 100. The remote server 140 may be located outside the host vehicle 100. For example, the remote server 140 may be associated with another vehicle (e.g., V2V communications), an infrastructure component 215 (e.g., V2I communications), a first responder, a mobile device associated with the operator of the host vehicle 100, etc. The transceiver 120 may be one device or may include a separate transmitter and receiver.

The user interface 125 presents information to and receives information from an operator of the host vehicle 100. The user interface 125 may be located, e.g., on an instrument panel in a passenger compartment of the host vehicle 100, or wherever may be readily seen by the operator. The user interface 125 may include dials, digital readouts, screens, speakers, and so on for providing information to the operator, e.g., human-machine interface (HMI) elements such as are known. The user interface 125 may include buttons, knobs, keypads, microphone, and so on for receiving information from the operator.

The propulsion system 130 of the host vehicle 100 generates energy and translates the energy into motion of the host vehicle 100. The propulsion system 130 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 130 can include an electronic control unit (ECU) or the like that is in communication with and receives input from the computer 105 and/or a human operator. The human operator may control the propulsion system 130 via, e.g., an accelerator pedal and/or a gear-shift lever.

The brake system 135 is typically a conventional vehicle braking subsystem and resists the motion of the host vehicle 100 to thereby slow and/or stop the host vehicle 100. The brake system 135 may include friction brakes such as disc brakes, drum brakes, band brakes, etc.; regenerative brakes; any other suitable type of brakes; or a combination. The brake system 135 can include an electronic control unit (ECU) or the like that is in communication with and receives input from the computer 105 and/or a human operator. The human operator may control the brake system 135 via, e.g., a brake pedal.

Figure 2:
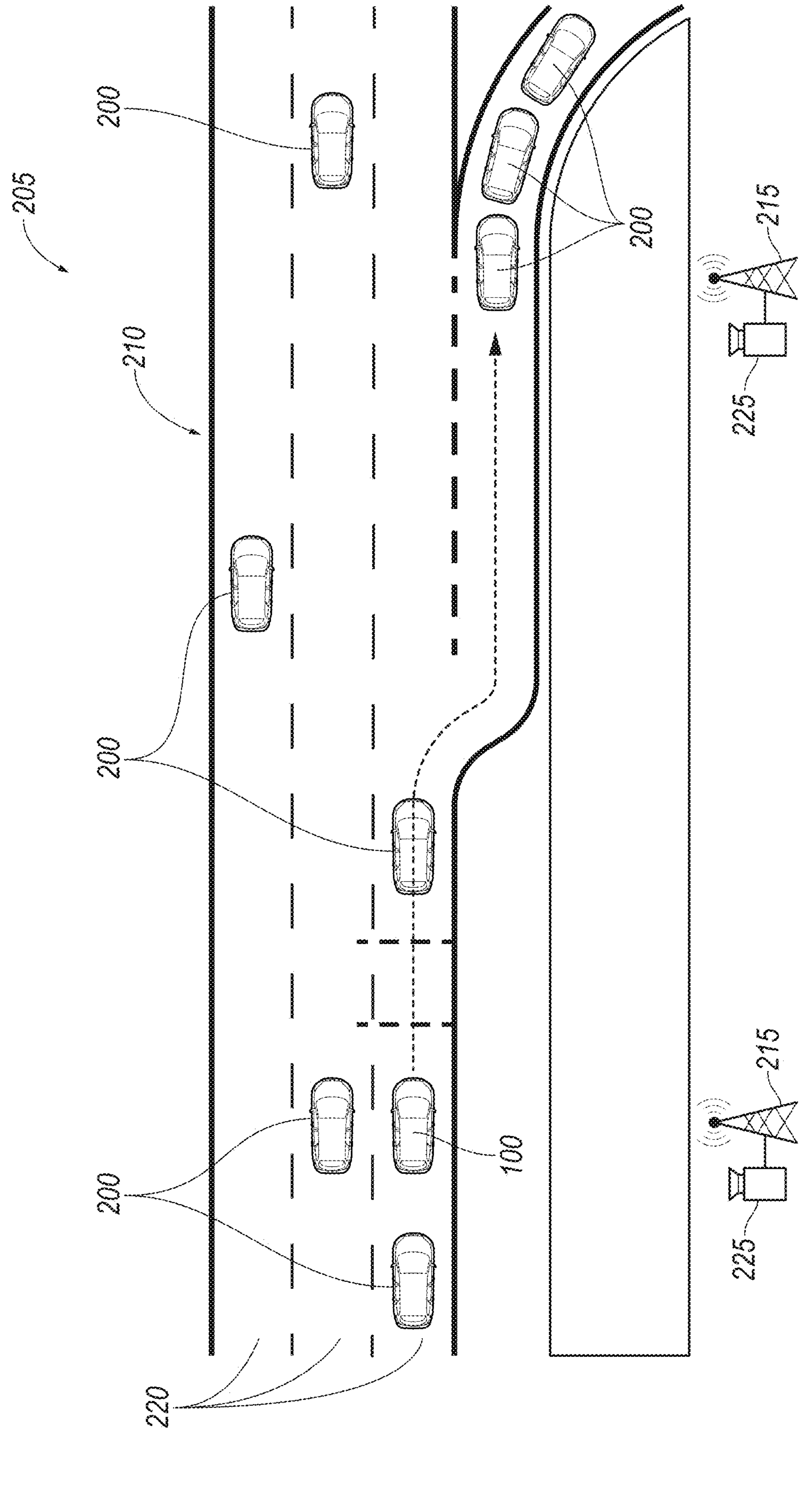
FIG. 2 is a diagrammatic top view of an environment through which the host vehicle and a plurality of target vehicles are traveling.

With reference to FIG. 2, the host vehicle 100 is traveling through an environment 205. The environment 205 is the geographic area in the vicinity of the host vehicle 100, i.e., surrounding the host vehicle 100. The environment 205 may include roads 210; stationary objects such as infrastructure components 215, buildings, traffic controls, etc.; topographical features; etc. The roads 210 may include multiple lanes 220.

The infrastructure component 215 may include the remote server 140 and at least one infrastructure sensor 225. The infrastructure component 215 may be fixed in position relative to the road 210, e.g., at a location next to the road 210. The road 210 may have multiple such infrastructure components 215 spaced from each other at regular intervals along the road 210.

Each infrastructure sensor 225 has a field of view encompassing the road 210. The position of the infrastructure component 215 may provide the infrastructure sensors 225 with the fields of view that encompass the road 210. For example, the infrastructure sensor 225 may be mounted to a body of the infrastructure component 215 at an elevated location that is near the road 210, and the infrastructure sensor 225 may be oriented downward toward the road 210. The regular spacing of the infrastructure components 215 may be such that the fields of view of infrastructure sensors 225 on adjacent infrastructure components 215 overlap.

The position of the infrastructure component 215 puts the remote server 140 in range of the road 210. The regular spacing of the infrastructure components 215 may be such that the ranges of remote servers 140 on adjacent infrastructure components 215 overlap. The host vehicle 100 thus switches from one infrastructure component 215 to the next infrastructure component 215 while traveling along the road 210.

The roads 210 may be used by the host vehicle 100 as well as target vehicles 200. For the purposes of this disclosure, "host vehicle" is defined as a vehicle under the control of the computer 105, and "target vehicle" is defined as a different vehicle than the host vehicle 100. The target vehicles 200 that are of interest for the techniques described below may be the target vehicles 200 in the lane 220 of travel of the host vehicle 100. The lane 220 of travel of the host vehicle 100 is the lane 220 of the road 210 that the host vehicle 100 is currently occupying, and may also include lanes 220 that the host vehicle 100 will traverse while following an intended route. As one example, the lane 220 of travel of the host vehicle 100 shown in FIG. 2 is the rightmost lane 220 and then the offramp. The target vehicles 200 in the lane 220 of travel may include one or more target vehicles 200 positioned forward of the host vehicle 100 and one or more target vehicles 200 positioned behind the host vehicle 100.

For the purposes of this disclosure, a "kinematic state" is defined as a mathematical description of the position and/or motion of an entity. The kinematic states may include some combination of a position, a heading, a velocity vector, a scalar speed, and/or a yaw rate. For example, the kinematic states may include longitudinal position, scalar speed, and scalar acceleration. The computer 105 is programmed to determine a kinematic state of the host vehicle 100, called a host kinematic state, based on data from the sensors 115, e.g., from a GPS sensor, wheel speed sensors, IMUs, etc.

The computer 105 is programmed to determine kinematic states of the target vehicles 200, called target kinematic states. For example, the computer 105 may receive data indicating the target kinematic states via the transceiver 120 from the remote server 140. The remote server 140 may determine the target kinematic states based on data from the infrastructure sensors 225, e.g., image data or range data, or on data received from the target vehicles 200 reporting the target kinematic states. The remote server 140 may then broadcast the kinematic states to all the vehicles 100, 200 within range, or the remote server 140 may transmit the kinematic states to the host vehicle 100, e.g., in response to a query by the host vehicle 100. Alternatively or additionally, the computer 105 may determine the target kinematic states based on data from the sensors 115, e.g., positions and velocities of the target vehicles 200 over time from radar, ultrasonics sensors, and/or lidar.

The computer 105 is programmed to execute an adaptive cruise control. Cruise control maintains a vehicle at a set speed without an operator providing input through an accelerator pedal. Adaptive cruise control is cruise control that lowers the speed of the vehicle when a slower-moving vehicle is ahead of the vehicle in order to maintain a distance from the slower-moving vehicle. Adaptive cruise control can also raise the speed of the vehicle back to the set speed when the slower-moving vehicle is no longer ahead of the vehicle. Executing the adaptive cruise control includes actuating the propulsion system 130 and the brake system 135 according to an adaptive-cruise-control algorithm stored on the computer 105, described in detail below.

The computer 105 can be programmed to execute the adaptive cruise control according to parameters of the adaptive cruise control. For example, the parameters of the adaptive cruise control can include a target speed and a target gap. The computer 105 can be programmed to, according to the adaptive cruise control, actuate the propulsion system 130 and/or the brake system 135 to maintain a speed of the host vehicle 100 at the target speed and to accelerate up to the target speed. The computer 105 can be programmed to, according to the adaptive cruise control, vary the speed to maintain a distance from a leading target vehicle 200 back to the host vehicle 100 at the target gap when the leading target vehicle 200 is traveling below the target speed. The target gap can be a function of the speed and/or of the target speed. The parameters can be set by the operator of the host vehicle 100 when activating or using the adaptive cruise control, can be stored in memory, and/or can be determined based on data received by the computer 105 according to formulas stored in memory.

The computer 105 may be programmed to activate the adaptive cruise control, i.e., to begin actuating the propulsion system 130 and the brake system 135 according to the adaptive cruise control, in response to receiving an input to activate the adaptive cruise control from the operator, e.g., via the user interface 125. The computer 105 may be programmed to deactivate the adaptive cruise control, i.e., to cease actuating the propulsion system 130 and the brake system 135 according to the adaptive cruise control, in response to receiving an input to deactivate the driver-assist feature from the operator, e.g., via the user interface 125 or via pressing the brake pedal. The computer 105 may lack programming to activate or deactivate the adaptive cruise control other than in response to inputs from the operator. Ultimate control over whether the adaptive cruise control is active can rest with the operator.

As a general overview of the adaptive cruise control of this disclosure, the computer 105 formulates a control-Lyapunov function and a plurality of control barrier functions. The computer 105 then formulates constraints based on the control-Lyapunov function, the control barrier function, and the physical capabilities of the host vehicle 100. Each CBF constraint, based on a respective control barrier function, helps the host vehicle 100 to not contact a respective one of the target vehicles 200. The Lyapunov constraint, based on the control-Lyapunov function, helps the host vehicle 100 maintain or accelerate up to the target speed when not constrained by any of the CBF constraints. The physical constraints keep the input acceleration within the capabilities of the host vehicle 100. The computer 105 optimizes an objective function subject to the constraints by solving analytic expressions corresponding to the constraints. Each analytic expression provides a respective possible input acceleration. The computer 105 thereby populates an acceleration set with the possible input accelerations. The computer 105 then selects one of the possible input accelerations from the acceleration set so as to satisfy the constraints. The selected input acceleration serves as the input acceleration for controlling the host vehicle 100.

The computer 105 is programmed to formulate a control-Lyapunov function for the host vehicle 100 based on the target speed for the host vehicle 100. The term "control-Lyapunov function" is used herein in its mathematical sense as a function used to test whether a system is asymptotically stabilizable, that is, whether for any state there exists a control such that the system can be brought to the zero state asymptotically by applying the control. In this disclosure, the control is the acceleration of the host vehicle 100. For example, the control-Lyapunov function may include a difference between the current speed of the host vehicle 100 and the target speed of the host vehicle 100, e.g., a square of the difference, as in the following expression:

$$V=(v_H-v_D)^2$$

in which V is the control-Lyapunov function, $v_H$ is the current speed of the host vehicle 100, and $v_D$ is the target speed of the host vehicle 100.

Determining the input acceleration (described below) can be subject to a Lyapunov constraint based on the control-Lyapunov function. The Lyapunov constraint may be that a sum of a time derivative of the control-Lyapunov function and the control-Lyapunov function weighted by a parameter is less than zero, e.g., as in the following expression:

$$\dot{V}(v_H,\alpha_H)+\lambda_V V\le 0$$

in which $\alpha_H$ is the current acceleration of the host vehicle 100 and $\lambda_V$ is a parameter weighting the control-Lyapunov function V. The parameter $\lambda_V$ may be chosen such that neither the time derivative of the control-Lyapunov function nor the control-Lyapunov function dominates the Lyapunov constraint. Given the form of the control-Lyapunov function above, an equivalent expression for the Lyapunov constraint is the following:

$$2(v_H-v_D)\alpha_H+\lambda_V V\le 0$$

The computer 105 may determine a target value for a gap between the host vehicle 100 and a respective target vehicle 200. The gap is measured longitudinally, i.e., along the lane 220 of travel of the host vehicle 100. The target value for the gap will be referred to as a target gap. The computer 105 may determine the target gap such that a stopping distance of the host vehicle 100 at a preset acceleration does not exceed a maximum stopping distance for the host vehicle 100 to not contact the target vehicle 200, e.g., by setting the stopping distances equal to each other:

$$s_{Hf}=s_{Tf,i}$$

in which i is an index of the target vehicles, sus is the stopping distance of the host vehicle 100 at the preset acceleration and $s_{Tf,i}$ is the maximum stopping distance such that the host vehicle 100 does not contact the ith target vehicle 200. The index i may range from 1 to N, with N being a total number of target vehicles 200 of interest. The preset-acceleration stopping distance $s_{Hf}$ is the distance that the host vehicle 100 will travel while braking at the preset acceleration until reaching a stop, e.g., as given in the following expression:

$$s_{Hf}=v_H t_{0H}+\frac{1}{2}a_C t_{0H}^2$$

in which $t_{0H}=-v_H/a_C$ is the time at which the host vehicle 100 reaches a stop and $a_C$ is the preset acceleration. The preset acceleration $a_C$ may be chosen to be comfortable for occupants of the host vehicle 100. The preset acceleration $a_C$ is negative, i.e., represents a deceleration of the host vehicle 100. The maximum stopping distance is the sum of the target gap and the distance that the target vehicle 200 will travel while braking at a maximum deceleration until reaching a stop, e.g., as given in the following expression:

$$S_{Tf,i}=G_{0,i}+v_{Ti}t_{0Ti}+\frac{1}{2}a_{Tmax}t_{0Ti}^2$$

in which $G_{0i}$ is the target gap from the host vehicle 100 to the ith target vehicle 200, $v_{Ti}$ is the current speed of the ith target vehicle 200, $t_{0Ti}=-v_{Ti}/a_{Tmax}$ is the time at which the ith target vehicle 200 reaches a stop, and $a_{Tmax}$ is a preset value representing a maximum deceleration of the ith target vehicle 200. Thus, the target gap to the ith target vehicle 200 is given by the following expression:

$$G_{0,i}=\frac{v_{Ti}^2}{2a_{Tmax}}-\frac{v_H^2}{2a_C}$$

The computer 105 may determine the target gap for each target vehicle 200, e.g., each target vehicle 200 in the lane 220 of travel of the host vehicle 100.

The computer 105 is programmed to formulate a plurality of control barrier functions for the host vehicle 100. Each control barrier function is based on a respective kinematic state of a respective target vehicle 200. For example, each control barrier function may include a difference between the gap between the host vehicle 100 and the respective target vehicle 200 and the target gap between the host vehicle 100 and the respective target vehicle 200, e.g., each control barrier function may be the difference between the gap between the host vehicle 100 and the respective target vehicle 200 and the target gap between the host vehicle 100 and the respective target vehicle 200, as in the following expression:

$$h_i = G_i - G_{0,i}$$

in which $h_i$ is the control barrier function for the ith target vehicle 200 and $G_i$ is the gap between the host vehicle 100 and the ith target vehicle 200. The target vehicles 200 for which the computer 105 formulates the control barrier functions may include one or more target vehicles 200 positioned forward of the host vehicle 100 and one or more target vehicles 200 positioned behind the host vehicle 100, e.g., in the same lane 220 of travel as the host vehicle 100.

Determining the input acceleration (described below) can be subject to a plurality of CBF constraints based on the respective control barrier functions. Each CBF constraint can be that a sum of a time derivative of the control barrier function $h_i$ and a first function $f(\cdot)$ of the control barrier function $h_i$ exceeds a first value. The first value can be zero. For example, each CBF constraint can be represented by the following equation:

$$\dot{h}_i + f(h_i) \geq 0$$

The first function $f(\cdot)$ can be locally Lipschitz continuous, i.e., within a range of the first function $f(\cdot)$ that is implicated by the CBF constraint, the absolute value of the slope between any two points is not greater than a predefined real number. In other words, there is a maximum rate of change of the first function $f$ with respect to the first control barrier function $h_i$. The first function $f(\cdot)$ can be a class $\kappa$ function, i.e., is strictly increasing and is equal to zero when the argument is zero, i.e., $f(0)=0$. The first function $f(\cdot)$ can be chosen to cause the component of the vehicle to actuate in time so that the host vehicle 100 does not contact the respective target vehicle 200. For example, the first function $f(h_i)$ can be a product of a parameter $\lambda$ and the respective control barrier function $h_i$, i.e., $f(h_i)=\lambda h_i$. The parameter $\lambda$ can be chosen to control the sensitivity of the first constraint. Given the forms of the control barrier function, the target gap, and the first function, an equivalent expression of the CBF constraints is the following:

$$\frac{-v_H}{a_C}\alpha_H \leq v_{Ti} - v_H - \frac{v_{Ti}}{a_{Tmax}}a_{Ti} + \lambda(G_i - G_{0,i})$$

in which $\alpha_{Ti}$ is the current acceleration of the ith target vehicle 200.

Determining the input acceleration (described below) can be subject to at least one physical constraint. The physical constraints may include that the acceleration of the host vehicle 100 is greater than a preset minimum acceleration and/or less than a preset maximum acceleration, as given in the following expression:

$$\alpha_{min} \leq \alpha_H \leq \alpha_{max}$$

in which $\alpha_{min}$ is the preset minimum acceleration and $\alpha_{max}$ is the preset maximum acceleration. The preset minimum and maximum accelerations may be chosen based on the capabilities of the component of the host vehicle 100 being controlled by the acceleration, e.g., the propulsion system 130 and/or the brake system 135. The physical constraints may further include that a change in acceleration of the host vehicle 100 is greater than a preset minimum change and/or less than a preset maximum change, as given in the following expression:

$$\Delta\alpha_{min} \leq \alpha_H - \alpha_{prev} \leq \Delta\alpha_{max}$$

in which $\Delta\alpha_{min}$ is the preset minimum change in acceleration, $\alpha_{prev}$ is the actual acceleration of the host vehicle 100 at an immediately previous timestep, and $\Delta\alpha_{max}$ is the preset maximum change in acceleration. The preset minimum and maximum changes in acceleration may be chosen based on the capabilities of the component of the host vehicle 100 being controlled by the acceleration, e.g., the propulsion system 130 and/or the brake system 135.

The computer 105 may be programmed to determine the input acceleration based on the control-Lyapunov function and the control barrier functions. For example, the computer 105 may optimize an objective function subject to the Lyapunov constraint and the CBF constraints, as well as subject to the physical constraints. The objective function may be a combination, e.g., a summation, of the stopping distances of the host vehicle 100 and the target vehicles 200 in the lane 220 of travel of the host vehicle 100. The objective function and the constraints may be formulated as a quadratic program. Quadratic programming means solving optimization problems formulated as quadratic functions. For example, solving the quadratic program can include minimizing a sum of the squares of the stopping distances subject to the constraints.

To solve the quadratic program, the computer 105 may populate an acceleration set by solving a plurality of analytic expressions based on the constraints. The acceleration set includes a Lyapunov input acceleration based on the control-Lyapunov function, a plurality of CBF input accelerations based on the control barrier functions, and physical-constraint input accelerations based on the physical constraints, as will each be described below. After populating the acceleration set, the computer 105 selects an acceleration from the acceleration set that satisfies all the constraints, and the computer 105 uses that selection as the input acceleration for the adaptive cruise control.

The computer 105 is programmed to determine the Lyapunov input acceleration based on the control-Lyapunov function. For example, the computer 105 may solve an analytic expression for the Lyapunov input acceleration. The analytic expression includes the target speed of the host vehicle 100 and the current speed of the host vehicle 100, e.g., a difference of the target speed of the host vehicle 100 and the current speed of the host vehicle 100. The analytic expression may be derived from the Lyapunov constraint, e.g., by treating the Lyapunov constraint as an equality and solving for the acceleration of the host vehicle 100, as in the following expression:

$$\alpha_{CLF} = \frac{-\lambda_V(v_H - v_D)}{2}$$

in which $\alpha_{CLF}$ is the Lyapunov input acceleration. The acceleration set includes the Lyapunov input acceleration.

The computer 105 is programmed to determine respective CBF input accelerations based on the respective control barrier functions for the target vehicles 200 of interest. For example, the computer 105 may solve a plurality of analytic expressions for the respective CBF input accelerations. Each analytic expression includes the kinematic state of the respective target vehicle 200 and a kinematic state of the host vehicle 100, e.g., the current speeds of the host vehicle 100 and the respective target vehicle 200, the current acceleration of the respective target vehicle 200, and the gap between the host vehicle 100 and the respective target vehicle 200. Each analytic expression includes the difference between the gap between the host vehicle 100 and the respective target vehicle 200 and the target gap. Each analytic expression may be derived from the respective CBF constraint, e.g., by treating the CBF constraint as an equality and solving for the acceleration of the host vehicle 100, as in the following expression:

$$\alpha_{CBF,i} = \left( \frac{-v_{Ti} + v_H + \frac{v_{Ti}}{a_{Tmax}} a_{Ti} - \lambda(G_i - G_{0,i})}{v_H} \right) a_C$$

in which $\alpha_{CBF,i}$ is the CBF input acceleration with respect to the ith target vehicle 200. The analytic expressions for each of the target vehicles 200 may use this same formula, including both the target vehicles 200 positioned forward of the host vehicle 100 and the target vehicles 200 positioned behind the host vehicle 100. The acceleration set includes the CBF input accelerations for the respective target vehicles 200, for a total of N CBF input accelerations.

The computer 105 is programmed to determine respective physical-constraint input accelerations for the respective physical constraints. The physical-constraint input accelerations may be prestored in the memory of the computer 105. The physical-constraint input accelerations may be derived from the physical constraints, e.g., by treating the physical constraints as equalities and solving for the acceleration for each physical constraint. The acceleration set includes the preset minimum acceleration $\alpha_{min}$, the preset maximum acceleration $\alpha_{max}$, the sum of the actual acceleration of the host vehicle 100 at a previous timestep and the preset minimum change in acceleration (i.e., $\Delta\alpha_{min}+\alpha_{prev}$), and the sum of the actual acceleration of the host vehicle 100 at a previous timestep and the preset maximum change in acceleration (i.e., $\Delta\alpha_{max}+\alpha_{prev}$).

The computer 105 is programmed to select the input acceleration from the acceleration set, which includes the CBF input accelerations and the Lyapunov input acceleration. The selected input acceleration may be a minimum of the CBF input accelerations and the Lyapunov input acceleration. The computer 105 may select the input acceleration so as to satisfy the constraints. For example, the computer 105 may select the maximum of the preset minimum acceleration amin; the sum of the actual acceleration of the host vehicle 100 at a previous timestep and the preset minimum change in acceleration (i.e., $\Delta\alpha_{min}+\alpha_{prev}$); and a minimum of the Lyapunov input acceleration $\alpha_{CLF}$, the CBF input accelerations $\alpha_{CBF,i}$, the preset maximum acceleration $\alpha_{max}$, and the sum of the actual acceleration of the host vehicle 100 at a previous timestep and the preset maximum change in acceleration (i.e., $\Delta\alpha_{max}+\alpha_{prev}$), as in the following expression:

$$\alpha_H = \max(\min(\alpha_{CLF}, \alpha_{CBF,1}, \ldots, \alpha_{CBF,N}, \alpha_{max}, \Delta\alpha_{max} + \alpha_{prev}), \alpha_{min}, \Delta\alpha_{min} + \alpha_{prev})$$

This use of maximum and minimum is chosen to help ensure that the constraints are satisfied.

The computer 105 is programmed to actuate a component of the host vehicle 100 according to the selected input acceleration. The component includes at least one of the propulsion system 130 and the brake system 135. The computer 105 may actuate the propulsion system 130 for a positive value of the selected input acceleration and the brake system 135 for a negative value of the selected input acceleration. Actuating the propulsion system 130 according to the selected input acceleration can include increasing the acceleration of the host vehicle 100 up to the selected input acceleration. Actuating the brake system 135 according to the selected input acceleration can include increasing the braking force until the deceleration of the host vehicle 100 equals the selected input acceleration.

Figure 3:
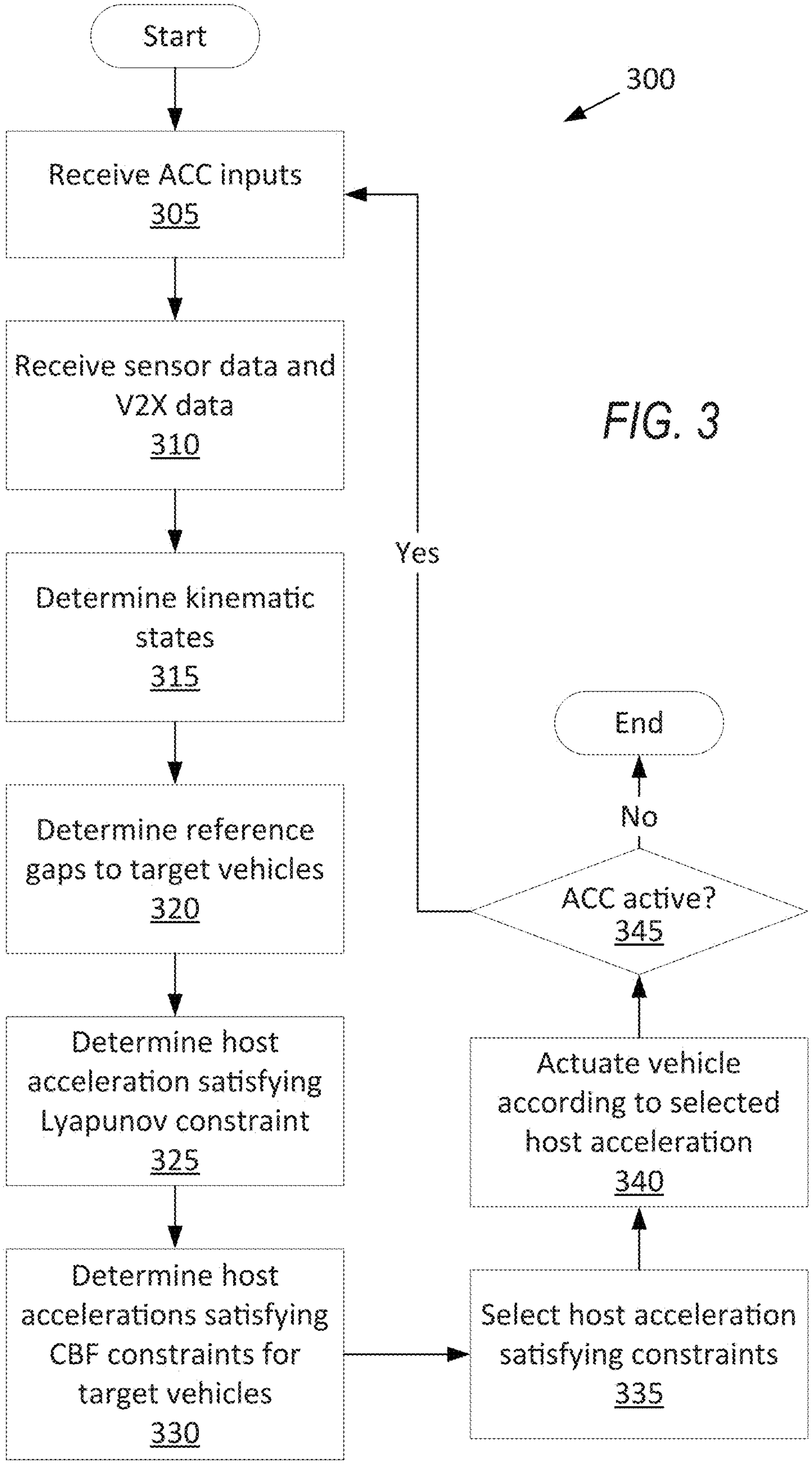
FIG. 3 is a flowchart of an example process for operating an adaptive cruise control of the host vehicle.

FIG. 3 is a flowchart illustrating an example process 300 for operating the adaptive cruise control of the host vehicle 100. The memory of the computer 105 stores executable instructions for performing the steps of the process 300 and/or programming can be implemented in structures such as mentioned above. The process 300 may begin when the operator activates the adaptive cruise control, as described above. As a general overview of the process 300, the computer 105 receives inputs specifying parameters of the adaptive cruise control, receives data from the sensors 115 and the remote server 140, determines the kinematic states, determines the target gaps to the target vehicles 200, determines the Lyapunov input acceleration, determines the CBF accelerations, selects the input acceleration from the acceleration set, and actuates a component of the host vehicle 100 according to the selected input acceleration. The process 300 may repeat until the operator deactivates the adaptive cruise control.

The process 300 begins in a block 305, in which the computer 105 receives the inputs from the operator of the host vehicle 100 specifying the parameters of the adaptive cruise control, e.g., the target speed, as described above.

Next, in a block 310, the computer 105 receives data from the sensors 115 and from the remote server 140 via the transceiver 120, as described above.

Next, in a block 315, the computer 105 determines the host kinematic state and the target kinematic states based on the data received in the block 310, as described above.

Next, in a block 320, the computer 105 determines the target gaps for the respective target vehicles 200, as described above.

Next, in a block 325, the computer 105 formulates the control-Lyapunov function and determines the Lyapunov input acceleration based on the control-Lyapunov function, as described above.

Next, in a block 330, the computer 105 formulates the control barrier functions based on the target kinematic states from the block 315 and the target gaps from the block 320 and determines the CBF input accelerations based on the control barrier functions, as described above.

Next, in a block 335, the computer 105 selects the input acceleration from the acceleration set including the CBF input accelerations from the block 330 and the Lyapunov input acceleration from the block 325, as described above.

Next, in a block 340, the computer 105 actuates the component of the host vehicle 100 according to the selected input acceleration from the block 335, as described above.

Next, in a decision block 345, the computer 105 determines whether the computer 105 received an input deactivating the adaptive cruise control via the user interface 125, as described above. In the absence of an input to deactivate the adaptive cruise control, the process 300 returns to the block 305 to continue operating the adaptive cruise control at a next timestep. In response to receiving an input to deactivate the adaptive cruise control, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Terms such as "front," "forward," "longitudinal," "back," "rearward," "left," "right," "lateral," etc., are understood relative to the host vehicle 100. The adjectives "first" and "second" are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

formulate a plurality of control barrier functions for a host vehicle, each control barrier function based on a respective kinematic state of a respective target vehicle;

determine respective CBF input accelerations based on the respective control barrier functions;

formulate a control-Lyapunov function for the host vehicle based on a target speed for the host vehicle;

determine a Lyapunov input acceleration based on the control-Lyapunov function;

select an input acceleration from an acceleration set including the CBF input accelerations and the Lyapunov input acceleration; and actuate a component of the host vehicle according to the selected input acceleration.

2. The computer of claim 1, wherein at least one of the control barrier functions is for a first target vehicle of the target vehicles, the first target vehicle being positioned behind the host vehicle.

3. The computer of claim 2, wherein at least one of the control barrier functions is for a second target vehicle of the target vehicles, the second target vehicle being positioned forward of the host vehicle.

4. The computer of claim 1, wherein at least one of the control barrier functions is for a first target vehicle of the target vehicles, the first target vehicle being positioned forward of the host vehicle; and at least one of the control barrier functions is for a second target vehicle of the target vehicles, the second target vehicle being positioned forward of the first target vehicle.

5. The computer of claim 1, wherein the instructions further include instructions to receive data indicating the kinematic states of the target vehicles from a server remote from the host vehicle.

6. The computer of claim 1, wherein the selected input acceleration is a minimum of the CBF input accelerations and the Lyapunov input acceleration.

7. The computer of claim 1, wherein the acceleration set includes a preset maximum acceleration.

8. The computer of claim 1, wherein the acceleration set includes a sum of an actual acceleration of the host vehicle and a preset maximum change in acceleration.

9. The computer of claim 1, wherein the instructions further include instructions to solve a plurality of analytic expressions for the respective CBF input accelerations, each analytic expression including the kinematic state of the respective target vehicle and a kinematic state of the host vehicle.

10. The computer of claim 9, wherein each analytic expression includes a difference between a gap between the host vehicle and the respective target vehicle and a target value for the gap.

11. The computer of claim 9, wherein the target vehicles include a first target vehicle positioned behind the host vehicle and a second target vehicle positioned forward of the host vehicle, and the analytic expressions for the first target vehicle and the second target vehicle have a same formula.

12. The computer of claim 1, wherein the instructions further include instructions to solve an analytic expression for the Lyapunov input acceleration, the analytic expression including the target speed of the host vehicle and a current speed of the host vehicle.

13. The computer of claim 1, wherein the component includes at least one of a propulsion system and a brake system.

14. The computer of claim 1, wherein the target vehicles are in a lane of travel of the host vehicle.

15. A method comprising:

formulating a plurality of control barrier functions for a host vehicle, each control barrier function based on a respective kinematic state of a respective target vehicle;

determining respective CBF input accelerations based on the respective control barrier functions;

formulating a control-Lyapunov function for the host vehicle based on a target speed for the host vehicle;

determining a Lyapunov input acceleration based on the control-Lyapunov function;

selecting an input acceleration from an acceleration set including the CBF input accelerations and the Lyapunov input acceleration; and actuating a component of the host vehicle according to the selected input acceleration.

16. The method of claim 15, wherein at least one of the control barrier functions is for a first target vehicle of the target vehicles, the first target vehicle being positioned behind the host vehicle.

17. The method of claim 15, further comprising receiving data indicating the kinematic states of the target vehicles from a server remote from the host vehicle.

18. The method of claim 15, wherein the selected input acceleration is a minimum of the CBF input accelerations and the Lyapunov input acceleration.

19. The method of claim 15, further comprising solving a plurality of analytic expressions for the respective CBF input accelerations, each analytic expression including the kinematic state of the respective target vehicle and a kinematic state of the host vehicle.

20. The method of claim 15, wherein the component includes at least one of a propulsion system and a brake system.

* * * * *